US012384181B2

(12) United States Patent
Kozaki et al.

(10) Patent No.: US 12,384,181 B2
(45) Date of Patent: Aug. 12, 2025

(54) LIQUID DISCHARGE APPARATUS

(71) Applicant: SEIKO EPSON CORPORATION, Tokyo (JP)

(72) Inventors: Kohei Kozaki, Shiojiri (JP); Katsunari Kumagai, Okaya (JP)

(73) Assignee: Seiko Epson Corporation, Tokyo (JP)

(*) Notice: Subject to any disclaimer, the term of this patent is extended or adjusted under 35 U.S.C. 154(b) by 207 days.

(21) Appl. No.: 18/193,380

(22) Filed: Mar. 30, 2023

(65) Prior Publication Data

US 2023/0322005 A1 Oct. 12, 2023

(30) Foreign Application Priority Data

Apr. 1, 2022 (JP) ................................ 2022-061653

(51) Int. Cl.
*B41J 29/13* (2006.01)
*B41J 29/02* (2006.01)

(52) U.S. Cl.
CPC ............... *B41J 29/13* (2013.01); *B41J 29/02* (2013.01)

(58) Field of Classification Search
CPC ........... B41J 29/13; B41J 29/02; B41J 25/001
See application file for complete search history.

(56) References Cited

U.S. PATENT DOCUMENTS

| | | | | |
|---|---|---|---|---|
| 11,052,657 | B2 * | 7/2021 | Yoshimura | B41J 2/175 |
| 2013/0057615 | A1 * | 3/2013 | Torigoe | B41J 29/377 347/39 |
| 2019/0291445 | A1 | 9/2019 | Yamada | |

FOREIGN PATENT DOCUMENTS

| | | |
|---|---|---|
| JP | 2019-166728 A | 10/2019 |

* cited by examiner

*Primary Examiner* — Douglas X Rodriguez
*Assistant Examiner* — Tracey M McMillion
(74) *Attorney, Agent, or Firm* — WORKMAN NYDEGGER

(57) ABSTRACT

A liquid discharge apparatus includes a transport path that is configured to transport a medium in a transport direction, a liquid discharge head that discharges a liquid to the medium transported in the transport direction, a carriage that is configured to move the liquid discharge head in a width direction intersecting with the transport direction, a cover member that is located above the carriage and covers a movement range of the carriage, and an air flow adjustment cover that is located between the cover member and the carriage and covers the movement range of the carriage.

13 Claims, 6 Drawing Sheets

LIQUID DISCHARGE APPARATUS

The present application is based on, and claims priority from JP Application Serial Number 2022-061653, filed Apr. 1, 2022, the disclosure of which is hereby incorporated by reference herein in its entirety.

BACKGROUND

1. Technical Field

The present disclosure relates to a liquid discharge apparatus.

2. Related Art

Examples of this kind of liquid discharge apparatus include the liquid discharge apparatus described in JP-A-2019-166728. In JP-A-2019-166728, a serial ink jet printer that performs recording on a medium that is transported on a transport path as a carriage having a liquid discharge head reciprocates in a medium width direction is described.

When ink, which is a liquid, is discharged from the liquid discharge head and ink drops, which are liquid droplets, land on the medium, the ink drops that are flying generate a jet flow therearound. The jet flow is an air flow generated by liquid droplets that are flying. The jet flow flows in a random direction and affects orbits of other liquid droplets that are flying nearby. The jet flow flowing in a random direction bends the flying orbits of ink droplets from the liquid discharge head to the medium in a random direction, and recording may not be performed on the medium as intended. In addition, since the jet flow is an air flow that flows in a random direction, landing positions of the ink droplets cannot be corrected by adjusting the discharge timing of the ink droplets. In other words, as the landing accuracy of the ink droplets is lowered by the jet flow flowing in a random direction, the image quality of printing may be deteriorated. When gas existing between the liquid discharge head and the medium is unlikely to move, the jet flow is likely to bring an influence and may deteriorate the image quality of printing.

SUMMARY

In order to solve the above problem, a liquid discharge apparatus according to the present disclosure includes a transport path that is configured to transport a medium in a transport direction, a liquid discharge head that discharges a liquid to the medium transported in the transport direction, a carriage that is configured to move the liquid discharge head in a width direction intersecting with the transport direction, a cover member that is located above the carriage and covers a movement range of the carriage, and an air flow adjustment cover that is located between the cover member and the carriage and covers the movement range of the carriage.

DESCRIPTION OF EXEMPLARY EMBODIMENTS

Figure 1:
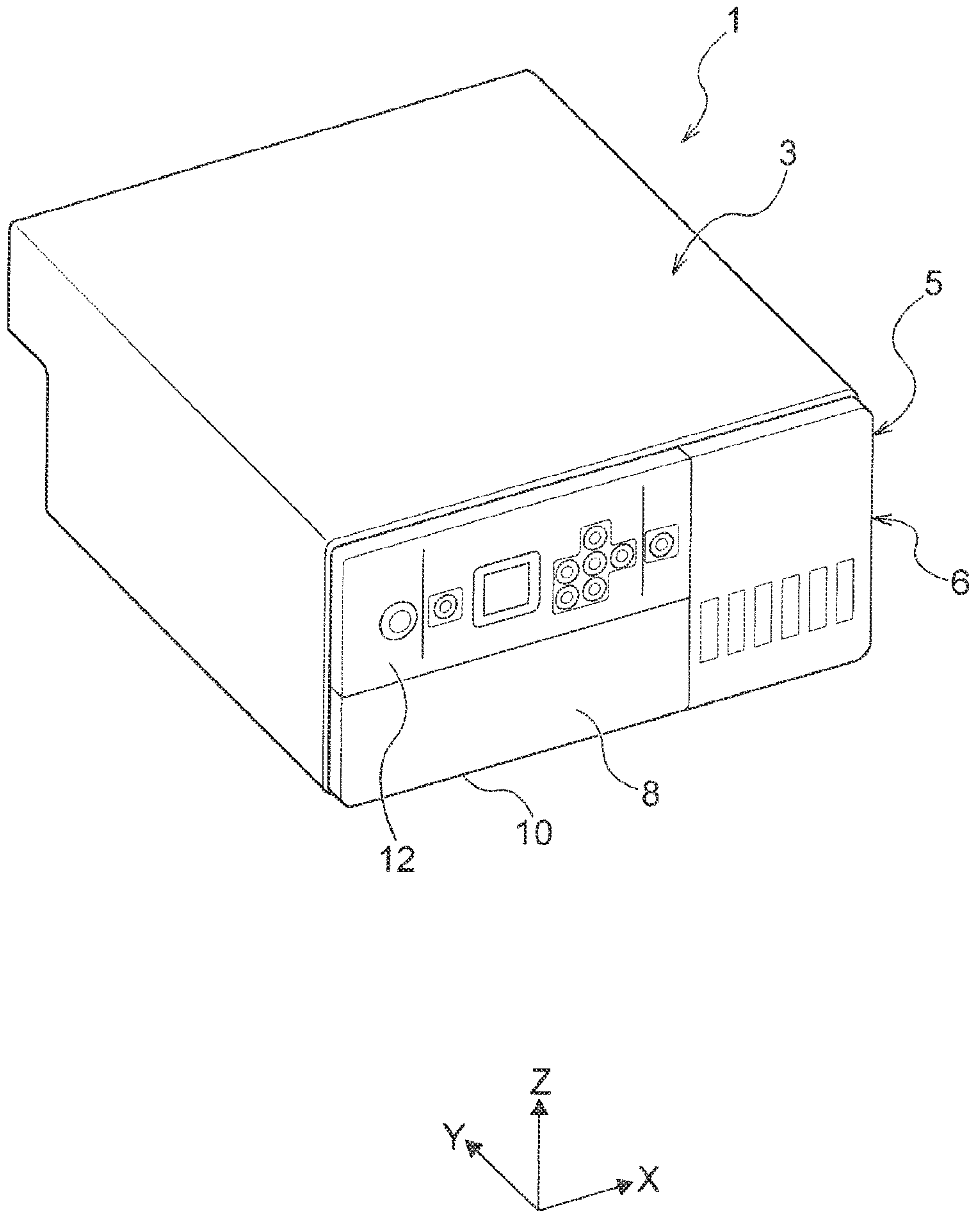
FIG. 1 is an external perspective view of an entire liquid discharge apparatus according to a first embodiment.

First, the present disclosure will be schematically described below. In order to solve the above problem, a liquid discharge apparatus according to a first aspect of the present disclosure includes a transport path that is configured to transport a medium in a transport direction, a liquid discharge head that discharges a liquid to the medium transported in the transport direction, a carriage that is configured to move the liquid discharge head in a width direction intersecting with the transport direction, a cover member that is located above the carriage and covers a movement range of the carriage, and an air flow adjustment cover that is located between the cover member and the carriage and covers the movement range of the carriage.

According to the aspect, the present disclosure includes an air flow adjustment cover that is located between the carriage and the cover member, which is located above the carriage and covers the movement range of the carriage, and covers the movement range of the carriage. As a result, since the air flow adjustment cover exists, a space above the carriage is narrower than the space above the carriage in which only the cover member would exist. As described above, when the space above the carriage becomes narrow by the air flow adjustment cover, gas in the space above the carriage is unlikely to move by the amount of the space that has narrowed when the carriage reciprocates. When the gas in the space above the carriage is unlikely to move, the gas in a space between the liquid discharge head and the medium, which is a space below the carriage, easily moves. This is because the movements of the gas in the space above the carriage and the gas in the space below the carriage are correlated to each other when the carriage reciprocates. When the gas between the liquid discharge head and the medium easily moves, the gas between the liquid discharge head and the medium can be flown in one direction in a moving direction of the carriage in conjunction with the reciprocating motion of the carriage. By generating an air flow that is larger than the jet flow and flows in one direction, the jet flow flowing in a random direction can be resolved. In addition, as the jet flow flowing in a random direction is resolved, a positional displacement of landing of an ink droplet caused by the air flow flowing in one direction can be corrected by adjusting the timing of discharging the ink droplet. In other words, as the gas between the liquid discharge head and the medium is adjusted to flow in one direction in conjunction with the reciprocating motion of the carriage, the influence of the jet flow can be suppressed. That is, according to the aspect, by providing the air flow adjustment cover, the gas between the liquid discharge head and the medium easily moves, whereby the influence of the jet flow can be suppressed, and thus deterioration of the image quality can be suppressed.

The liquid discharge apparatus according to a second aspect of the present disclosure, according to the first aspect, includes an external case that has a box shape, and an apparatus main body that is provided in the external case and configured to be drawn out and to which the carriage is attached, and the cover member forms a part of the external case, and the air flow adjustment cover is attached to the apparatus main body.

According to the aspect, in the liquid discharge apparatus in which the apparatus main body, to which the carriage is attached, is provided in the external case and configured to be drawn out, the air flow adjustment cover is provided in the apparatus main body, whereby effective effects can be obtained.

The liquid discharge apparatus according to a third aspect of the present disclosure, according to the first or second aspect, includes a carriage frame to which the carriage is movably attached, and the air flow adjustment cover is attached to the carriage frame.

According to the aspect, the air flow adjustment cover is attached to the carriage frame. As a result, the air flow adjustment cover can be easily attached in a state in which the distance from the carriage is short.

In the liquid discharge apparatus according to a fourth aspect of the present disclosure, according to the third aspect, the air flow adjustment cover is rotatably attached to the carriage frame and is configured to be located at an air flow adjustment position where the air flow adjustment cover covers the movement range of the carriage and a retreat position where the air flow adjustment cover is retreated from the air flow adjustment position and exposes the carriage and the transport path. Here, the phrase "exposing the carriage and the transport path" at the "retreat position where the air flow adjustment cover is retreated from the air flow adjustment position and exposes the carriage and the transport path" used in the specification means that the extent of exposure is sufficient as long as maintenance can be performed on the carriage even if all of the carriage is not exposed, and that the extent of exposure of the transport path is sufficient as long as the transport path is accessible for dealing with a jam of the medium.

According to the aspect, the air flow adjustment cover is configured to be located at the air flow adjustment position where the air flow adjustment cover covers the movement range of the carriage and the retreat position where the air flow adjustment cover is retreated from the air flow adjustment position and exposes the carriage and the transport path. As a result, by rotating the air flow adjustment cover to the retreat position, maintenance can be performed on the carriage. In addition, a jam of the medium generated in the transport path can be dealt with.

In the liquid discharge apparatus according to a fifth embodiment of the present disclosure, according to the third embodiment, the air flow adjustment cover includes a first cover that is attached to the carriage frame, and a second cover that is rotatably attached to a tip end of the first cover, and the second cover is configured to be located at an air flow adjustment position where the second cover covers the movement range of the carriage and a retreat position where the second cover is retreated from the air flow adjustment position and exposes the carriage and the transport path. Here, the phrase "exposing the carriage and the transport path" at the "retreat position where the second cover is retreated from the air flow adjustment position and exposes the carriage and the transport path" used in the specification means that the extent of exposure is sufficient as long as maintenance can be performed on the carriage even if all of the carriage is not exposed, and that the extent of exposure of the transport path is sufficient as long as the transport path is accessible for dealing with a jam of the medium.

According to the aspect, by rotating only the second cover of the air flow adjustment cover including the first cover and the second cover, the second cover can be located at the retreat position where the second cover exposes the carriage and the transport path. As a result, compared to a case where the entire air flow adjustment cover is rotated, the air flow adjustment cover can be rotated to be located at the retreat position with a small force.

In the liquid discharge apparatus according to a sixth aspect of the present disclosure, according to the fifth aspect, the second cover includes an operation knob for rotating operation, and the operation knob has, at a tip end, a mounting portion that is mounted on a mounted portion provided in another member to determine the air flow adjustment position of the second cover.

According to the aspect, since the second cover includes the operation knob for rotating operation, the user can easily perform rotating operation. In addition, the mounting portion at the tip end is configured to be mounted on the mounted portion provided in the other member to determine the air flow adjustment position of the second cover. As a result, the air flow adjustment position is stabilized, whereby the influence of the jet flow can be stably suppressed, and deterioration of the image quality can be suppressed.

In the liquid discharge apparatus according to a seventh aspect of the present disclosure, according to the fifth aspect, at least the second cover of the air flow adjustment cover has a plane surface facing the carriage and an opposite surface on which a reinforcing rib is formed.

According to the aspect, since at least the second cover of the air flow adjustment cover has a plane surface facing the carriage, at any position where the carriage reaches, the distance from the second cover is the same. As a result, the effects of the air flow adjustment cover can be effectively exhibited. In addition, since a reinforcing rib is formed on the opposite surface, the second cover can be formed of a thin, lightweight, and rigid member.

In the liquid discharge apparatus according to an eighth aspect of the present disclosure, according to the first or second aspect, a distance from the air flow adjustment cover to the carriage is variable.

According to the aspect, since the distance from the air flow adjustment cover to the carriage is variable, a change in the environment such as temperature and humidity can be dealt with by slightly adjusting the distance.

First Embodiment

Hereinafter, a liquid discharge apparatus according to a first embodiment will be specifically described with reference to FIGS. 1 to 6. In the following description, as illustrated in each figure, three axes orthogonal to each other are set as an X-axis, a Y-axis, and a Z-axis. The Z-axis direction corresponds to a vertical direction, that is, a gravitational force direction. The X-axis direction and the Y-axis direction correspond to a horizontal direction. In each figure, directions indicated by arrows of the three axes (X, Y, and Z) are positive directions of the respective directions, and the opposite directions thereof are negative directions.

Figure 2:
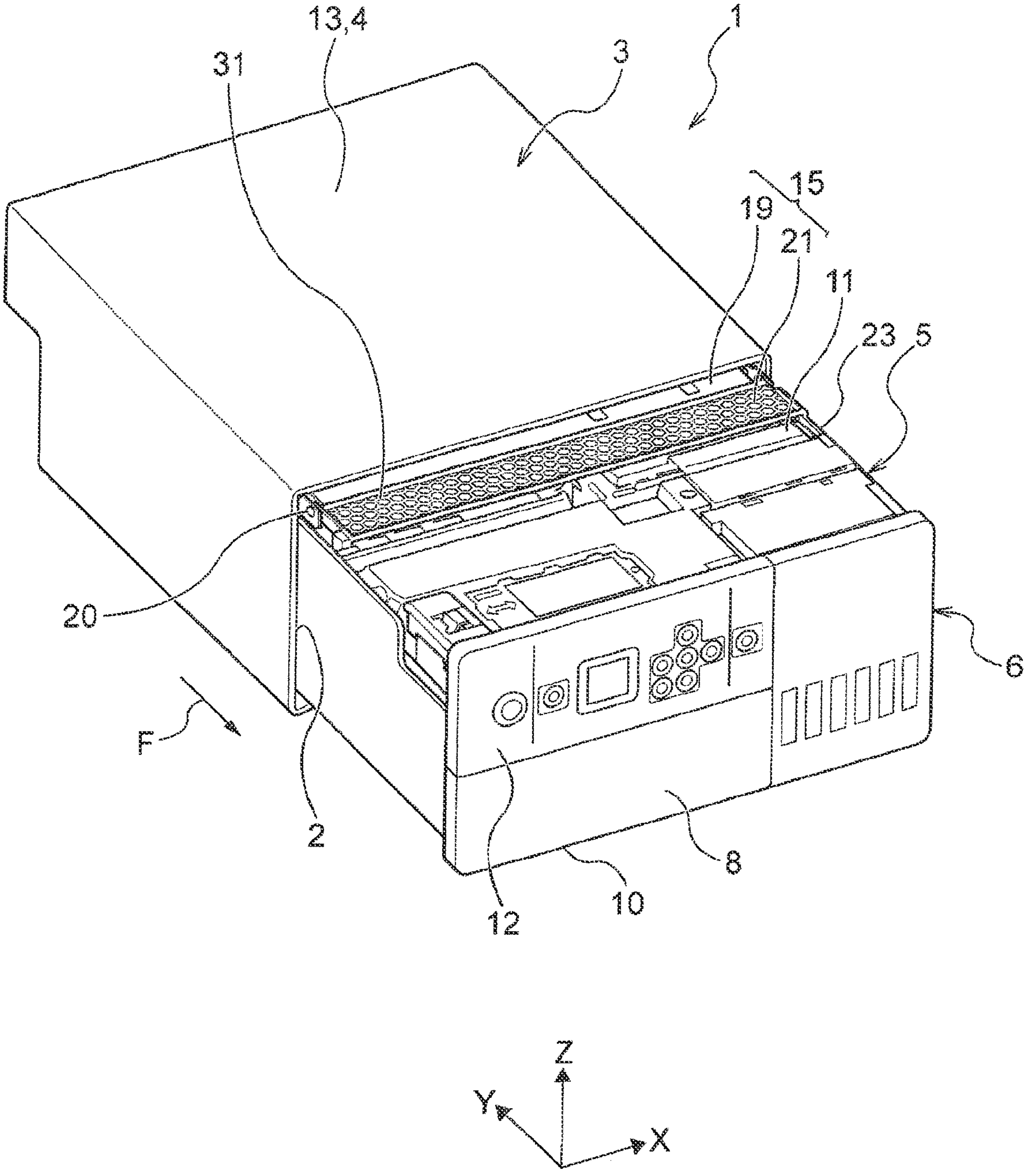
FIG. 2 is an external perspective view of the liquid discharge apparatus according to the first embodiment when an apparatus main body is drawn out halfway.
Figure 3:
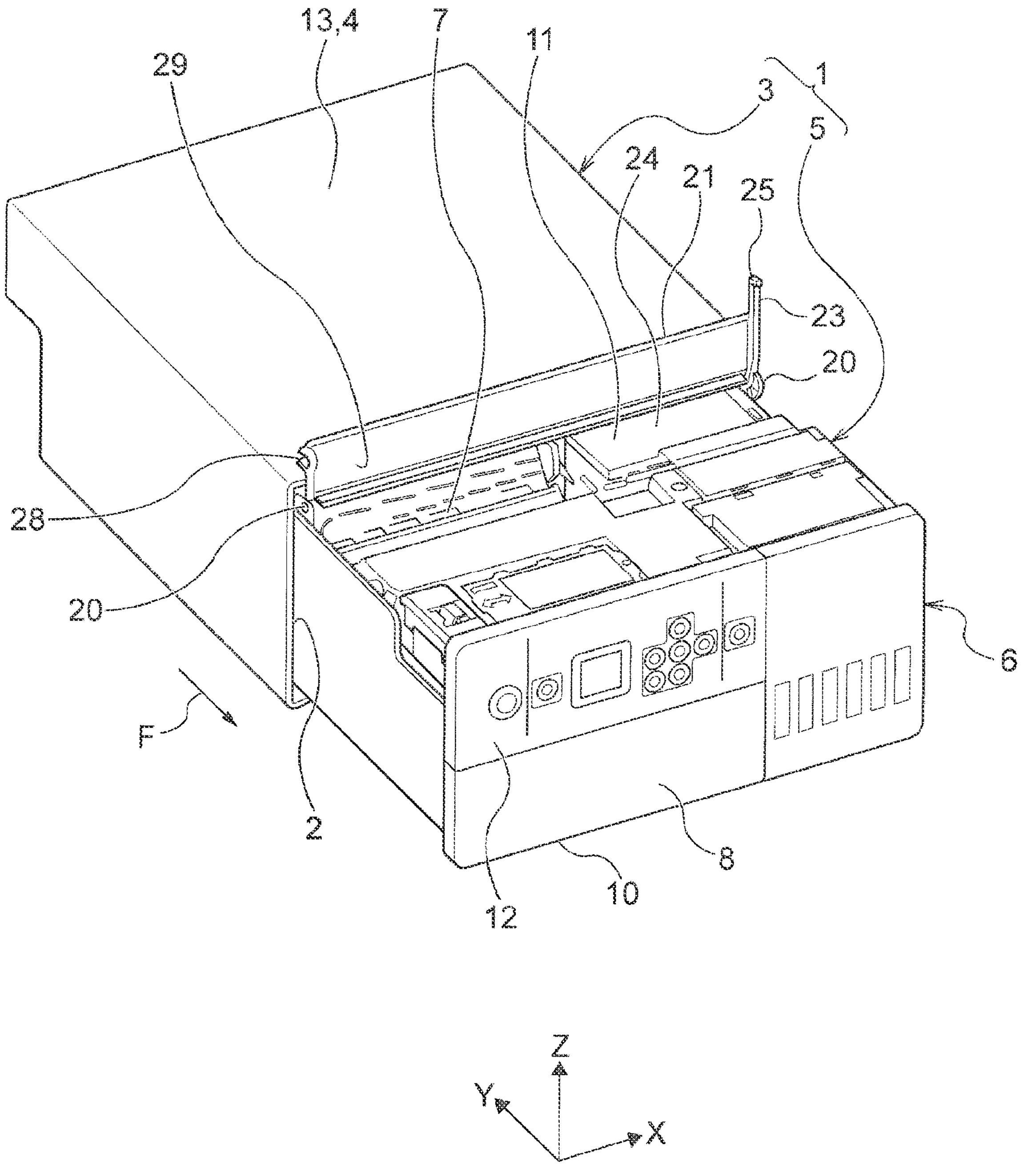
FIG. 3 is an external perspective view when a second cover is open in FIG. 2.

A liquid discharge apparatus 1 of the present embodiment is an ink jet printer that performs printing by discharging ink, which is a liquid, to a medium S (FIG. 6) such as a sheet of paper. As illustrated in FIGS. 1 to 3, the liquid discharge apparatus 1 has a box-shaped external case 3 and an apparatus main body 5 that is provided in the external case 3 and is configured to be drawn out. In the external case 3, one side surface 2 is open. The apparatus main body 5 is provided in the external case 3 so as to be drawn out through the side surface 2 that is open. FIG. 1 illustrates a state in which the apparatus main body 5 is stored in the external case 3, and FIGS. 2 and 3 illustrate a state in which the apparatus main body 5 is drawn out halfway from the inside of the external case 3. The apparatus main body 5 is configured such that the entire apparatus main body 5 can be drawn out from the external case 3. Note that the apparatus main body 5 may be configured such that the entire apparatus main body 5 is not drawn out from the external case 3.

The apparatus main body 5 includes a transport path 7 that can transport the medium S in a transport direction F, a liquid discharge head 9 that discharges the liquid to the medium S that is transported on the transport path 7 in the transport direction F, and a carriage 11 that can reciprocate the liquid discharge head 9 in a width direction (X-axis direction) intersecting with the transport direction F. Moreover, liquid discharge apparatus 1 includes a cover member 13 that is located above the carriage 11 and covers the movement range of the carriage 11. Here, the cover member 13 is configured with an upper surface 4 constituting a part of the external case 3. On the back surface of the upper surface 4 of the external case 3, that is, the inner surface, a plurality of ribs 30 for reinforcement (FIG. 6) that is elongated in the X-axis direction is formed. Moreover, an air flow adjustment cover 15 that is located between the cover member 13 and the carriage 11 is provided. The air flow adjustment cover 15 is configured so as to cover a reciprocating range of the carriage 11 from above. Here, "covering" of "covering a reciprocating range (X-axis direction) of the carriage 11 from above" preferably refers to a structure in which the entire reciprocating range (X-axis direction) is covered, but may be a structure in which only a part of the entire reciprocating range is covered.

The apparatus main body 5 has a front surface portion 6. As illustrated in FIG. 1, in a state in which the apparatus main body 5 is stored in the external case 3, the front surface portion 6 forms a part of an external appearance of the liquid discharge apparatus 1. In the apparatus main body 5, mechanical structures such as the carriage 11 and the transport path 7 are disposed on the rear side of the front surface portion 6 (+Y direction). An opening/closing portion 8 is provided in the front surface portion 6. The opening/closing portion 8 can be opened or closed with a lower end 10 as a fulcrum. As the opening/closing portion 8 is caused to enter an open state from a closed state in FIG. 1, the medium S is ejected from the apparatus main body 5. A medium inversion unit and the like (not illustrated) forming a part of the transport path 7 is disposed in the rearmost portion of the apparatus main body 5. A medium accommodating portion (not illustrated) is disposed at the bottom of the apparatus main body 5. In the apparatus main body 5, the medium S accommodated in the medium accommodating portion is transported in the transport direction F on the transport path 7 by a transport roller 14 (FIG. 6) and the like, and the liquid is discharged to the medium S in a region facing the liquid discharge head 9. The medium S is further transported on the transport path 7 and is discharged through the opening/closing portion 8 in the open state. As illustrated in FIG. 1, an operation panel 12 is disposed above the opening/closing portion 8 of the front surface portion 6.

Figure 5:
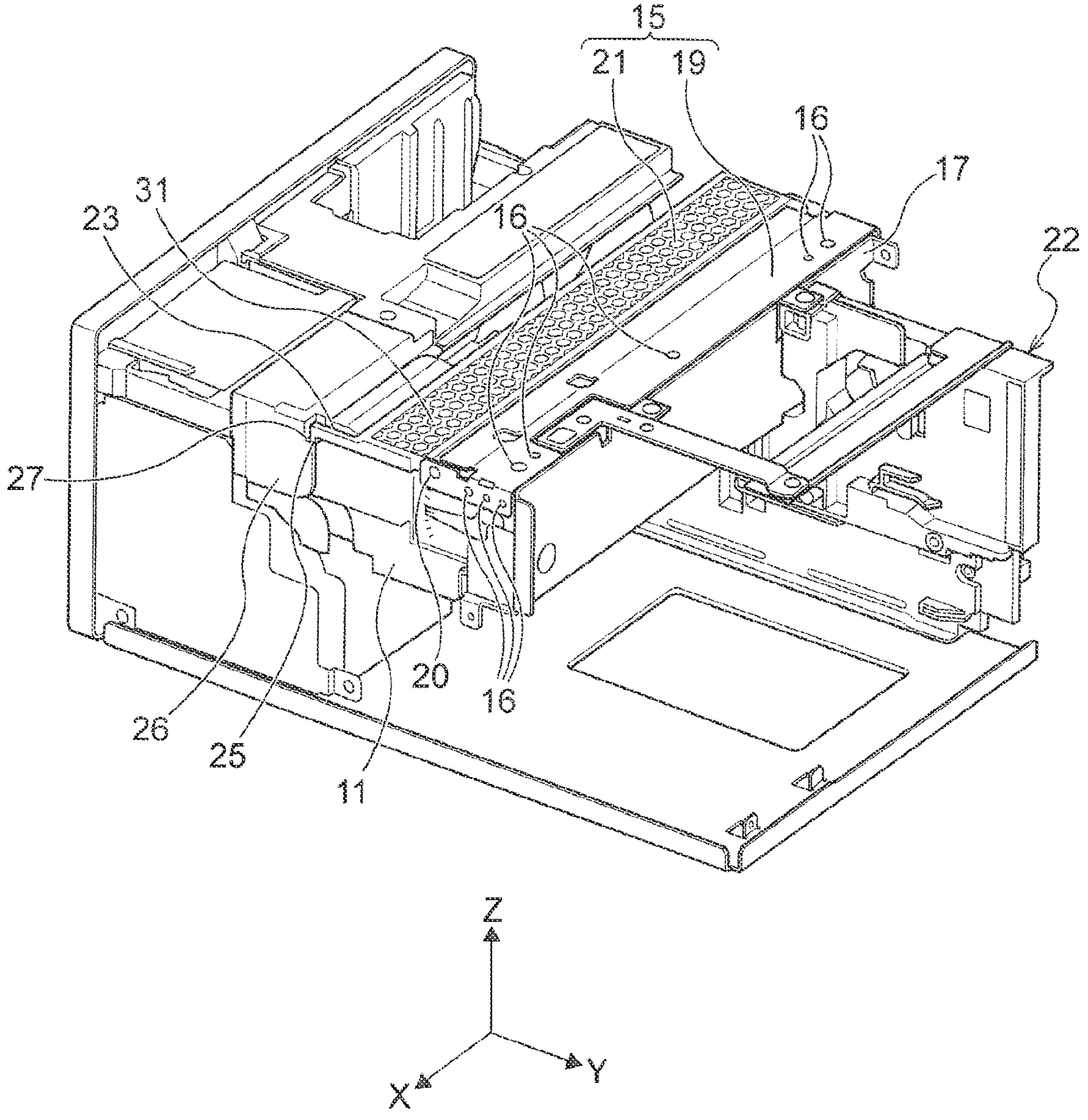
FIG. 5 is a perspective view of the apparatus main body, according to the first embodiment, a part of which is omitted.
Figure 6:
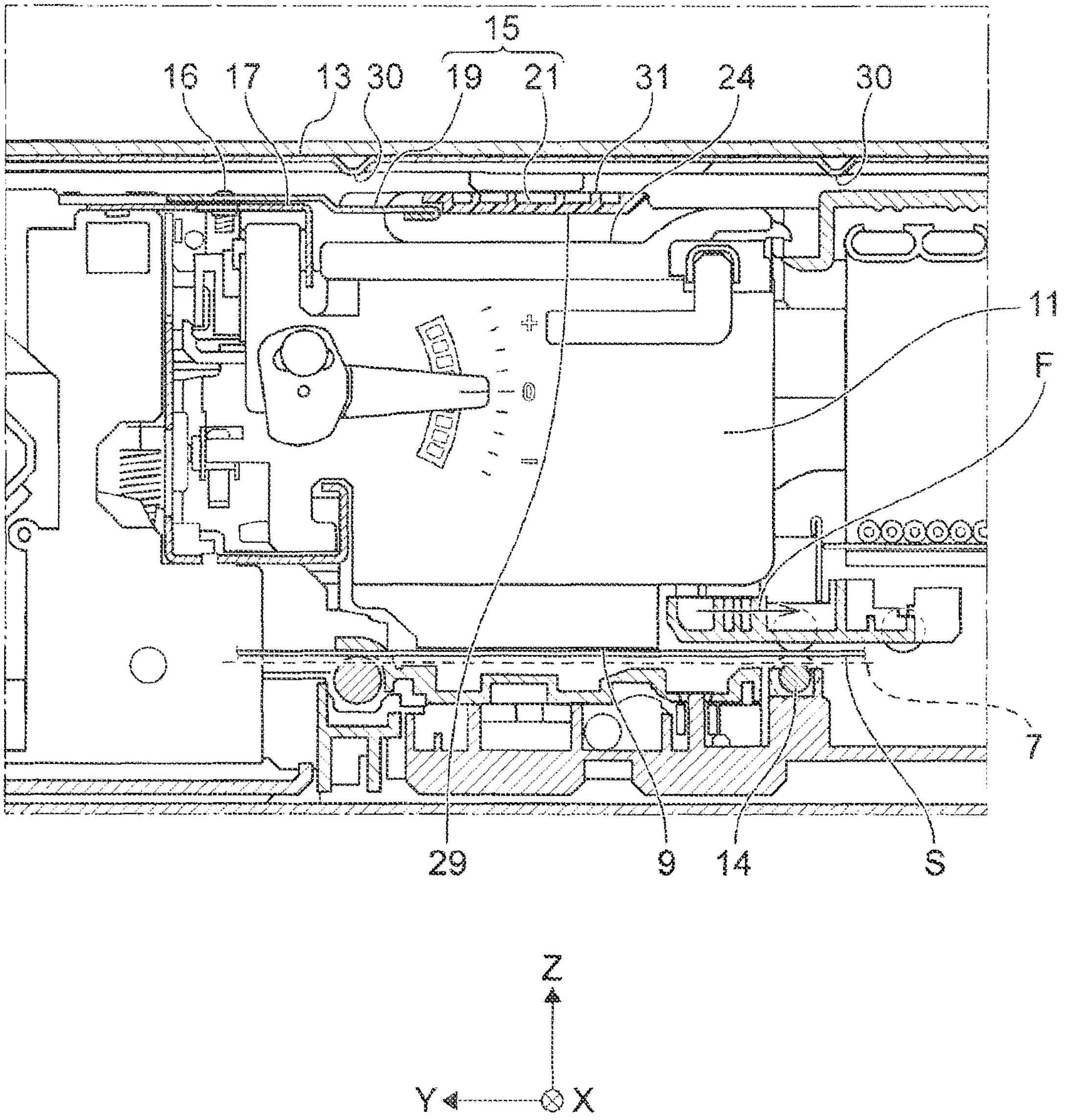
FIG. 6 is a sectional side view of a main portion of the liquid discharge apparatus according to the first embodiment.

In addition, as illustrated in FIGS. 5 and 6, in the present embodiment, the carriage 11 is attached to a carriage frame 17 that is fixed to a base frame 22 of the apparatus main body 5 so as to be able to reciprocate. In addition, the air flow adjustment cover 15 is attached to the carriage frame 17. In the present embodiment, the air flow adjustment cover 15 includes a first cover 19 attached to the carriage frame 17 and a second cover 21 rotatably attached to a tip end of the first cover 19. In addition, the second cover 21 is configured to be rotated so as to be located at an air flow adjustment position (FIG. 2) where the second cover 21 covers the movement range of the carriage 11 and a retreat position (FIG. 3) where the second cover 21 is retreated from the air flow adjustment position (FIG. 2) and exposes the carriage 11 and the transport path 7. Here, the phrase "exposing the carriage 11 and the transport path 7" at the "retreat position (FIG. 3) where the second cover 21 is retreated from the air flow adjustment position (FIG. 2) and exposes the carriage 11 and the transport path 7" means that the extent of exposure is sufficient as long as maintenance can be performed on the carriage 11 even if all of the carriage 11 is not exposed. In addition, the extent of exposure of the transport path 7 is sufficient as long as the transport path 7 is accessible for dealing with a jam of the medium S.

As illustrated in FIG. 6, in the present embodiment, the first cover 19 covers, from above, a part of the carriage 11, that is, a part of an upper surface 24 of the carriage 11 extending in the transport direction F from the carriage frame 17. Moreover, as illustrated in FIG. 6, the second cover 21 covers a part of the upper surface 24 of the carriage 11. In the present embodiment, the first cover 19 and the second cover 21 cover most of the upper surface 24 of the carriage 11, but not all of the upper surface 24. It has been confirmed that even if the first cover 19 and the second cover 21 do not cover all of the upper surface 24 of the carriage 11 as described above, the influence of the jet flow can be suppressed. The first cover 19 and the second cover 21 may be configured to cover all of the upper surface 24 of the carriage 11.

Figure 4A:
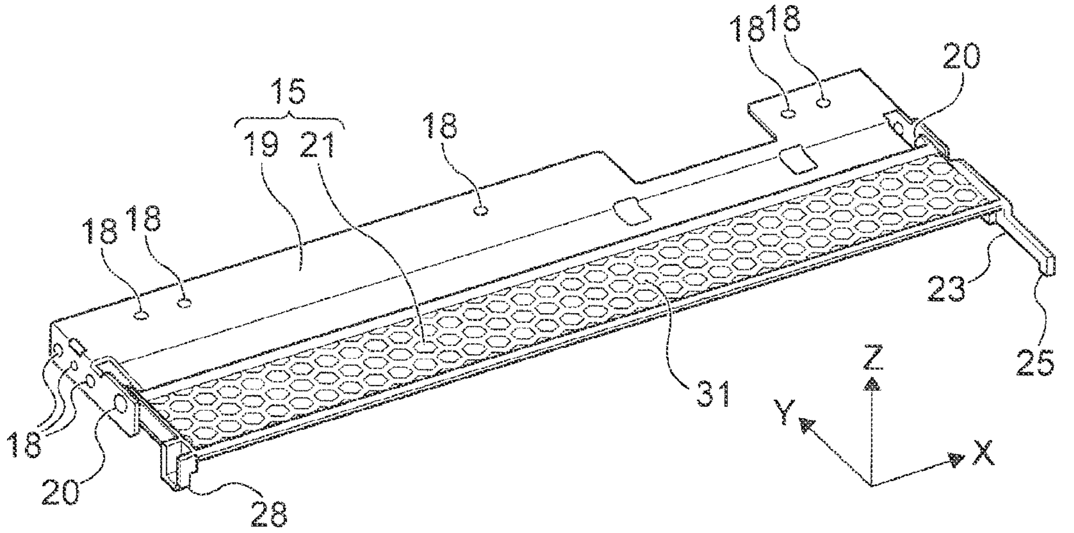
FIGS. 4A and 4B are perspective views for explaining a structure of an air flow adjustment cover.
Figure 4B:
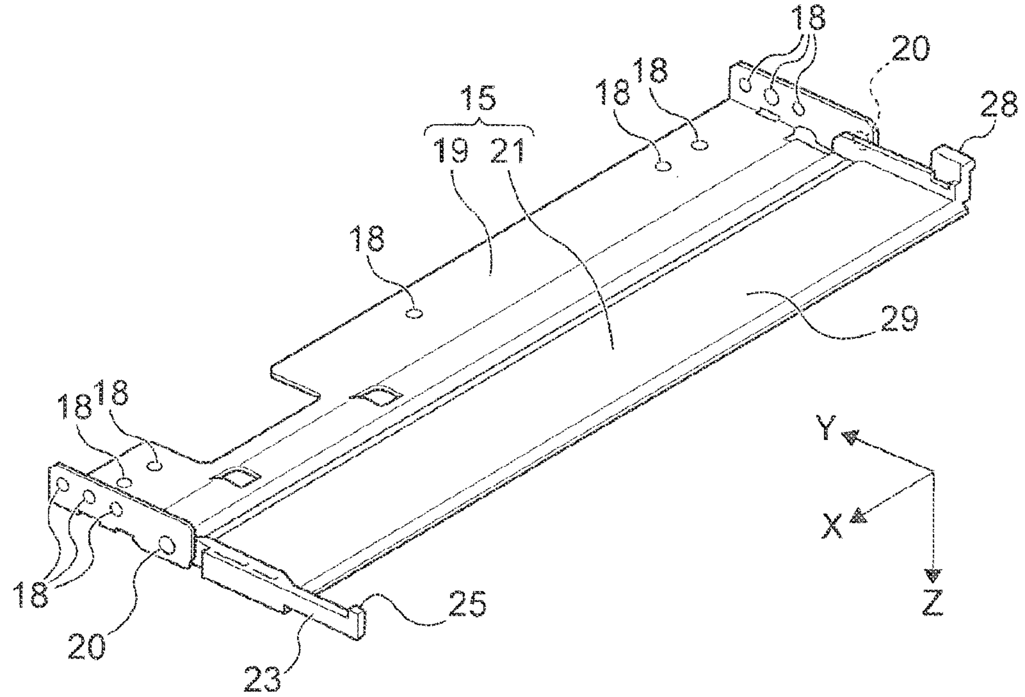

The first cover 19 is formed of a metal plate, and as illustrated in FIGS. 4A and 4B, and 5, the first cover 19 is fastened to the carriage frame 17 by screws 16 (FIG. 5). In FIGS. 4A and 4B, holes 18 are holes for screw fastening. Note that invisible portions of the screws 16 and the holes 18 in each figure are omitted. For the second cover 21, a rotating fulcrum 20 is provided at each end in the X-axis direction at the tip end of the first cover 19. That is, the second cover 21 is attached to the first cover 19 so as to rotate using the rotating fulcrum 20 as a fulcrum. In addition, the second cover 21 is formed of a synthetic resin material.

In addition, as illustrated in FIG. 5, in the present embodiment, the second cover 21 includes an operation knob 23 for rotating operation. A first mounting portion 25 at the tip end of the operation knob 23 is configured to come into contact with a mounted portion 27 provided in another member 26 provided in the apparatus main body 5 and determine the air flow adjustment position of the second cover 21. That is, the second cover 21 is configured such that when the second cover 21 is located at the air flow adjustment position (FIGS. 2 and 5) where the second cover 21 covers the carriage 11 from above, the first mounting portion 25 at the tip end of the operation knob 23 is mounted on the mounted portion 27 formed in the other member 26, and the orientation of the second cover 21 can be maintained. In the present embodiment, in the second cover 21, in addition to the first mounting portion 25 at the tip end of the operation knob 23, a second mounting portion 28 (FIGS. 4A and 4B) is provided on the opposite side. The second mounting portion 28 is also configured to come into contact with a mounted portion (not illustrated) provided in another member provided in the apparatus main body 5 and determine the air flow adjustment position of the second cover 21.

Moreover, as illustrated in FIGS. 4A and 4B, in the present embodiment, the second cover 21 of the air flow adjustment cover 15 has a plane surface 29 facing the carriage 11 and an opposite surface on which a reinforcing rib 31 is formed. It is preferable that the first cover 19 also has a plane surface facing the carriage 11. The reinforcing rib 31 makes it possible for the second cover 21 to be formed of a thin, lightweight, and rigid member, and the shape of the reinforcing rib 31 is not limited to the illustrated shape. The plane surface 29, the reinforcing rib 31, the operation knob 23, the first mounting portion 25, and the second mounting portion 28 of the second cover 21 are integrally formed of the synthetic resin material.

Description of Effects of Embodiment (1) According to the present embodiment, the liquid discharge apparatus 1 includes the air flow adjustment cover 15, which is located between the carriage 11 and the cover member 13 located above the carriage 11 and covers the movement range of the carriage 11 and covers the movement range of the carriage 11. As a result, since the air flow adjustment cover 15 exists, a space above the carriage 11 is narrower than the space above the carriage 11 in which only the cover member 13 would exist. As described above, when the space above the carriage 11 becomes narrow by the air flow adjustment cover 15, gas in the space above the carriage 11 is unlikely to move by the amount of the space that has narrowed when the carriage 11 reciprocates. When the gas in the space above the carriage 11 is unlikely to move, the gas between the liquid discharge head 9 and the medium S, which is a space below the carriage 11, easily moves. This is because the movements of the gas in the space above the carriage 11 and the gas in the space below the carriage 11 are correlated to each other when the carriage 11 reciprocates. When the gas between the liquid discharge head 9 and the medium S easily moves, the gas between the liquid discharge head 9 and the medium S can be flown in one direction in a moving direction of the carriage 11 in conjunction with the reciprocating motion of the carriage 11. By generating an air flow that is larger than the jet flow and flows in one direction, the jet flow flowing in a random direction can be resolved. In addition, as the jet flow flowing in a random direction is resolved, a positional displacement of landing of an ink droplet caused by the air flow flowing in one direction can be corrected by adjusting the discharge timing of the ink droplet. In other words, as the gas between the liquid discharge head 9 and the medium S is adjusted so as to flow in one direction in conjunction with the reciprocating motion of the carriage 11, the influence of the jet flow can be suppressed. That is, according to the present embodiment, by providing the air flow adjustment cover 15, the gas between the liquid discharge head 9 and the medium S easily moves, whereby the influence of the jet flow can be suppressed, and deterioration of the image quality can be suppressed.

(2) In addition, according to the present embodiment, in the liquid discharge apparatus 1 including the apparatus main body 5 to which the carriage 11 is attached and that is provided in the external case 3 and configured to be drawn out, the air flow adjustment cover 15 is provided in the apparatus main body 5, and thus especially effective effects can be obtained. Specifically, in a structure in which the apparatus main body 5 is drawn out from the external case 3, it is not structurally easy to provide the air flow adjustment cover 15 on the inner surface of the external case 3. However, in the present embodiment, since the air flow adjustment cover 15 is attached to the apparatus main body 5, the air flow adjustment cover 15 can be easily attached.

(3) In addition, according to the present embodiment, the air flow adjustment cover 15 is attached to the carriage frame 17 to which the carriage 11 is movably attached. As a result, the air flow adjustment cover 15 can be easily attached in a state in which the distance from the carriage 11 is short. (4) In addition, according to the present embodiment, by rotating only the second cover 21 of the air flow adjustment cover 15 including the first cover 19 and the second cover 21, the second cover 21 can be located at the retreat position where the second cover 21 exposes the carriage 11 and the transport path 7. As a result, compared to a case where the entire air flow adjustment cover 15 is rotated, the air flow adjustment cover 15 can be rotated to be located at the retreat position with a small force.

(5) In addition, according to the present embodiment, since the second cover 21 includes the operation knob 23 for rotating operation, the user can easily perform rotating operation. In addition, as the first mounting portion 25 at the tip end of the operation knob 23 is mounted on the mounted portion 27 provided in the other member 26 to determine the air flow adjustment position of the second cover 21. As a result, the air flow adjustment position is stabilized, whereby the influence of the jet flow can be stably suppressed, and deterioration of the image quality can be suppressed.

(6) In addition, according to the present embodiment, since at least the second cover 21 of the air flow adjustment cover 15 has the plane surface 29 facing the carriage 11, at any position where the carriage 11 reaches, the distance from the second cover 21 is the same. As a result, the effects of the air flow adjustment cover 15 can be effectively exhibited. In addition, since the reinforcing rib 31 is formed on the opposite surface, the second cover 21 can be formed of a thin, lightweight, and rigid member.

Second Embodiment

Next, a liquid discharge apparatus according to a second embodiment will be described. Parts having the same configurations as in the first embodiment are denoted by the same reference signs and descriptions thereof are omitted. Moreover, descriptions of parts having the same effects are also omitted. In the first embodiment, the air flow adjustment cover 15 is formed of two members of the first cover 19 and the second cover 21, but in the present embodiment, the air flow adjustment cover 15 is formed of a single member, instead of the two members. The present embodiment is different from the first embodiment only in that the air flow adjustment cover 15 is formed of a single member, instead of two members, and thus the present embodiment is not illustrated.

That is, the base end of the air flow adjustment cover 15 is rotatably attached to the carriage frame 17. In addition, as the entire air flow adjustment cover 15 is rotated, the air flow adjustment cover 15 is configured to be located at the air flow adjustment position (FIG. 2) where the air flow adjustment cover 15 covers the movement range of the carriage 11 and the retreat position (FIG. 3) where the air flow adjustment cover 15 is retreated from the air flow adjustment position (FIG. 2) and exposes the carriage 11 and the transport path 7. Here, the phrase "exposing the carriage 11 and the transport path 7" at the "retreat position (FIG. 3) where the air flow adjustment cover 15 is retreated from the air flow adjustment position (FIG. 2) and exposes the carriage 11 and the transport path 7" means, similarly to the first embodiment, that the extent of exposure is sufficient as long as maintenance can be performed on the carriage 11 even if all of the carriage 11 is not exposed. In addition, the extent of exposure of the transport path 7 is sufficient as long as the transport path 7 is accessible for dealing with a jam of the medium S.

Other Embodiments

The liquid discharge apparatus according to the present disclosure basically has the configurations of the above described embodiments. However, it is naturally possible to, for example, change and omit partial configurations without departing from the spirit of the present disclosure. In the above embodiments, a case in which the liquid discharge apparatus 1 has the apparatus main body 5 that can be drawn out from the external case 3 has been described, but the present disclosure is not limited thereto, and it is naturally possible that the apparatus main body 5 cannot be drawn out. In this case, the cover member 13 is configured to open and close, and the carriage 11 and the transport path 7 are exposed by opening and closing of the cover member 13. The air flow adjustment cover 15 is attached to the carriage frame 17 between the cover member 13 and the carriage 11. As a result, similarly to the first embodiment, the influence of the jet flow can be suppressed.

In the above embodiments, a case in which the air flow adjustment cover 15 is fixed to the carriage frame 17, and the distance from the carriage 11 cannot be changed has been described, but the air flow adjustment cover 15 may be configured such that the distance from the carriage 11 is variable. The structure in which the distance is variable can be achieved by using a micro screw structure, a rack and pinion mechanism, or the like. As a result, even when the influence of the jet flow is changed due to a change in the environment such as temperature and humidity, the change in the environment can be dealt with by slightly adjusting the distance.

In addition, in the above embodiment, the air flow adjustment cover 15 having a structure in which the first cover 19 and the second cover 21 are coupled to each other has been described, but the structure is not limited thereto. The air flow adjustment cover 15 may be formed of a single rotatable cover.

What is claimed is:

1. A liquid discharge apparatus comprising:
- a transport path that is configured to transport a medium in a transport direction;
- a liquid discharge head that discharges a liquid to the medium transported in the transport direction;
- a carriage that is configured to move the liquid discharge head in a width direction intersecting with the transport direction;
- a cover member that is located above the carriage and covers a movement range of the carriage; and
- an air flow adjustment cover that is located between the cover member and the carriage, covers the movement range of the carriage, and suppresses the generation of airflow between the carriage and the cover member.

2. The liquid discharge apparatus according to claim 1, further comprising:
- an external case that has a box shape; and
- an apparatus main body that is provided in the external case and configured to be drawn out and to which the carriage is attached, wherein
- the cover member forms a part of the external case, and
- the air flow adjustment cover is attached to the apparatus main body.

3. The liquid discharge apparatus according to claim 1, further comprising
- a carriage frame to which the carriage is movably attached, wherein
- the air flow adjustment cover is attached to the carriage frame.

4. The liquid discharge apparatus according to claim 3, wherein
- the air flow adjustment cover is rotatably attached to the carriage frame, and
- is configured to be located at an air flow adjustment position where the air flow adjustment cover covers the movement range of the carriage and a retreat position where the air flow adjustment cover is retreated from the air flow adjustment position and exposes the carriage and the transport path.

5. The liquid discharge apparatus according to claim 3, wherein
- the air flow adjustment cover includes
- a first cover that is attached to the carriage frame, and
- a second cover that is rotatably attached to a tip end of the first cover, and
- the second cover is configured to be located at an air flow adjustment position where the second cover covers the movement range of the carriage and a retreat position where the second cover is retreated from the air flow adjustment position and exposes the carriage and the transport path.

6. The liquid discharge apparatus according to claim 5, wherein
- the second cover includes an operation knob for rotating operation, and
- the operation knob has, at a tip end, a mounting portion that is mounted on a mounted portion provided in another member to determine the air flow adjustment position of the second cover.

7. The liquid discharge apparatus according to claim 5, wherein at least the second cover of the air flow adjustment cover has a plane surface facing the carriage and an opposite surface on which a reinforcing rib is formed.

8. The liquid discharge apparatus according to claim 1, wherein a distance from the air flow adjustment cover to the carriage is adjustable.

9. The liquid discharge apparatus according to claim 1, further comprising:
- an external case that has a box shape; and
- an apparatus main body that is provided in the external case and configured to be drawn out and to which the carriage is attached.

10. The liquid discharge apparatus according to claim 1, further comprising:
- an apparatus main body configured to which the carriage is attached, wherein
- the cover member is located above the apparatus main body, and
- the air flow adjustment cover is attached to the apparatus main body.

11. The liquid discharge apparatus according to claim 10, further comprising:

an external case that has a box shape, wherein the apparatus main body is provided in the external case and configured to be drawn out.

12. A liquid discharge apparatus comprising:

a transport path that is configured to transport a medium in a transport direction;

a liquid discharge head that discharges a liquid to the medium transported in the transport direction;

a carriage that is configured to move the liquid discharge head in a width direction intersecting with the transport direction;

a cover member that is located above the carriage and covers a movement range of the carriage;

an air flow adjustment cover that is located between the cover member and the carriage and covers the movement range of the carriage; and a carriage frame to which the carriage is movably attached, wherein the air flow adjustment cover is attached to the carriage frame, the air flow adjustment cover is rotatably attached to the carriage frame, and is configured to be located at an air flow adjustment position where the air flow adjustment cover covers the movement range of the carriage and a retreat position where the air flow adjustment cover is retreated from the air flow adjustment position and exposes the carriage and the transport path.

13. A liquid discharge apparatus comprising:

a transport path that is configured to transport a medium in a transport direction;

a liquid discharge head that discharges a liquid to the medium transported in the transport direction;

a carriage that is configured to move the liquid discharge head in a width direction intersecting with the transport direction;

a cover member that is located above the carriage and covers a movement range of the carriage;

an air flow adjustment cover that is located between the cover member and the carriage and covers the movement range of the carriage; and a carriage frame to which the carriage is movably attached, wherein the air flow adjustment cover is attached to the carriage frame, the air flow adjustment cover includes a first cover that is attached to the carriage frame, and a second cover that is rotatably attached to a tip end of the first cover, and the second cover is configured to be located at an air flow adjustment position where the second cover covers the movement range of the carriage and a retreat position where the second cover is retreated from the air flow adjustment position and exposes the carriage and the transport path.

* * * * *